United States Patent [19]

Kitoh et al.

[11] Patent Number: 5,139,689

[45] Date of Patent: Aug. 18, 1992

[54] METHOD FOR PREPARING PLZT TRANSPARENT CERAMIC

[75] Inventors: Ryozo Kitoh; Koichi Fukuda; Noriaki Arimura, all of Yamaguchi, Japan

[73] Assignee: Ube Industries, Ltd., Yamaguchi, Japan

[21] Appl. No.: 660,832

[22] Filed: Feb. 26, 1991

[30] Foreign Application Priority Data

Feb. 26, 1990 [JP] Japan ................................ 2-42630

[51] Int. Cl.$^5$ ............................................. C04B 35/46
[52] U.S. Cl. .................................... 252/62.9; 501/134
[58] Field of Search ................ 501/134; 252/62.3 BT, 252/62.9

[56] References Cited

U.S. PATENT DOCUMENTS

| | | | |
|---|---|---|---|
| 3,666,666 | 5/1972 | Haertling | 252/62.9 |
| 3,816,750 | 6/1974 | Liu | 250/338 |
| 3,917,780 | 11/1975 | Mazdiyasni et al. | 264/61 |
| 4,324,750 | 4/1982 | Maher | 264/61 |
| 4,990,324 | 2/1991 | Tomita et al. | 423/608 |

OTHER PUBLICATIONS

Journal of the American Ceramic Society, 1971, vol. 54, No. 1, p. 1.
J. P. Kokai 62-158117 and English Abstract.
J. P. Kokai 64-79068 and English abstract.

*Primary Examiner*—William R. Dixon, Jr.
*Assistant Examiner*—Chris Gallo
*Attorney, Agent, or Firm*—Sughrue, Mion, Zinn, Macpeak & Seas

[57] ABSTRACT

A method for preparing a PLZT ceramic having a composition represented by the following general formula:

$$(Pb_{1-x}La_x)(Zr_{1-y}Ti_y)_{1-0.25x}O_3$$

(wherein x is a numerical value ranging from 0.01 to 0.3 and y is a numerical value ranging from 0.05 to 0.95) comprises the steps of preparing PLZT calcined powder from oxides of Pb, La, Zr and Ti or compounds which can be converted into these oxides through calcination as starting materials; mixing $Sm_2O_3$ or $Bi_2O_3$ as an auxiliary agent for sintering with the calcined powder; forming the resulting mixture into a molded product having a desired shape; and then subjecting the molded product to normal pressure calcination at a temperature ranging from 1,000° to 1,300° C. in an atmosphere comprising oxygen gas and vapor of Pb. The method can be easily practicable and makes it possible to prepare PLZT calcined powder capable of being easily sintered from a cheap raw material according to a dry method. The PLZT calcined powder capable of being easily sintered can provide a PLZT transparent ceramic having high light transmittance in good reproducibility by forming it into a molded product having a desired shape and then subjecting the molded product to normal pressure calcination.

6 Claims, 1 Drawing Sheet

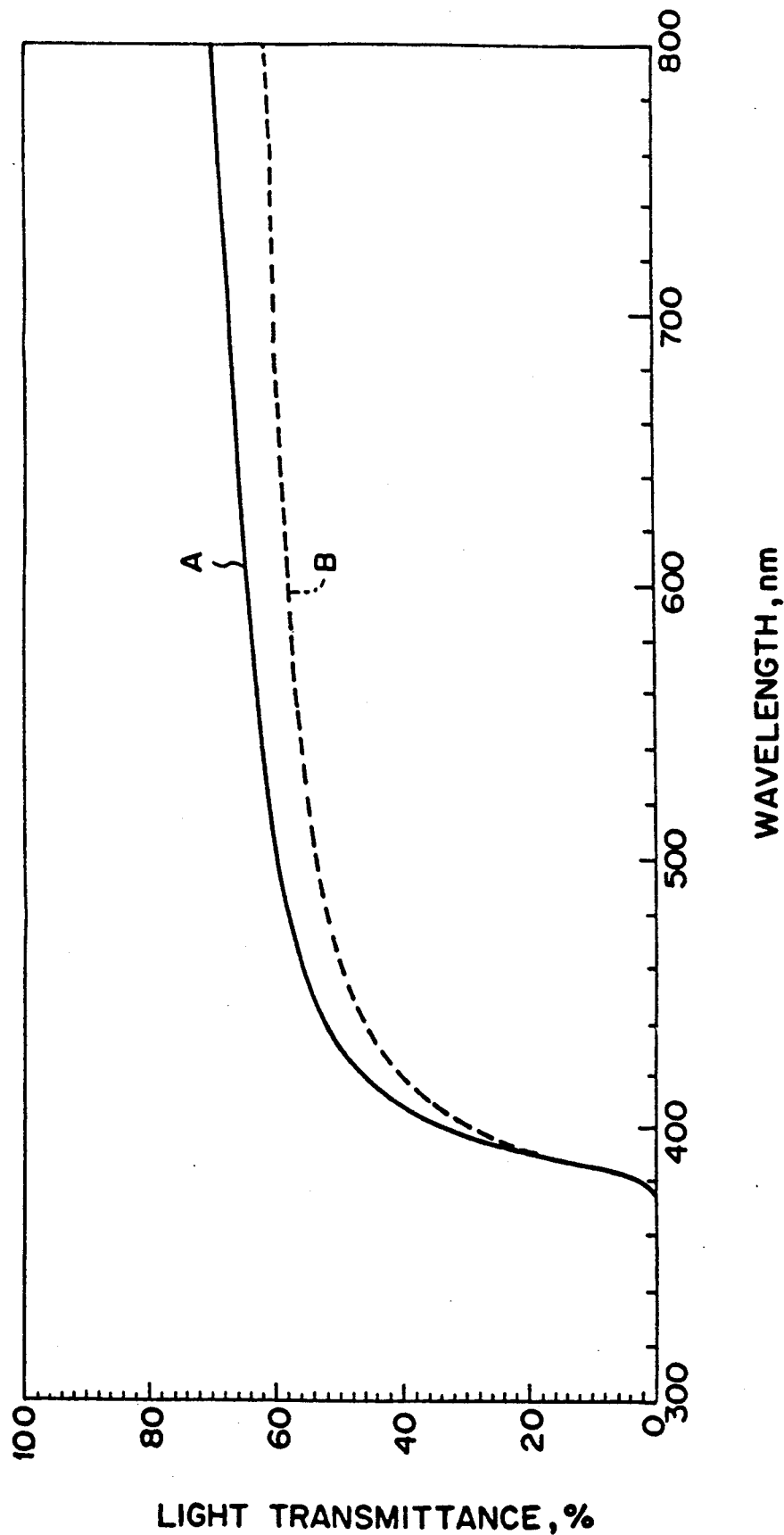

METHOD FOR PREPARING PLZT TRANSPARENT CERAMIC

BACKGROUND OF THE INVENTION

1. Field of the Invention

The present invention relates to a method for preparing a PLZT transparent ceramic which has a composition represented by the following general formula:

$$(Pb_{1-x}La_x)(Zr_{1-y}Ti_y)_{1-0.25x}O_3$$

(wherein x is a numerical value ranging from 0.01 to 0.3 and y is a numerical value ranging from 0.05 to 0.95) as well as the PLZT transparent ceramic per se obtained according to the foregoing method.

The PLZT ceramics have been anticipated as materials which may widely be used in various fields, for instance, optoelectronic materials such as those for use in making a photoshutter, a picture image-accumulating device and a light modulation element; electrostrictive materials and piezo-electric materials.

2. Description of the Prior Art

It has conventionally been known that PLZT transparent ceramics have been produced by preparing a powdery calcined raw material of PLZT according to a dry-grinding method, a coprecipitation method or an alkoxide method; forming the powder into a molded product having a desired shape; and then subjecting the molded product to hot-pressing or to a normal pressure-calcination under an oxygen gas atmosphere.

The dry-grinding method comprises mixing compounds (oxides) each containing Pb, La, Zr or Ti and then calcining the resulting mixture. If the calcined powder is formed into a molded product having a desired shape and then subjected to pressure-calcination called hot pressing, a PLZT ceramic having excellent quality can be obtained (see, for instance, Journal of American Ceramic Society, 1971, 54, No. 1, p. 1). However, the hot-pressing method suffers from problems such that molded articles having any desired large shape cannot be produced and that the mass production thereof is quite difficult since the size of dies is limited to a specific level. For this reason, there has been desired the development of a method for preparing PLZT calcined powder which can be subjected to the normal pressure-calcination in an oxygen gas atmosphere.

To solve the foregoing problems, there have been developed wet methods such as a coprecipitation method and an alkoxide method. For instance, Japanese Patent Unexamined Publication (hereinafter referred to as "J. P. KOKAI") No. Sho 62-158117 discloses a method for preparing PLZT calcined powder capable of being easily sintered which comprises the steps of precipitating Pb, La, Zr and Ti by coming bringing solutions of compounds containing these elements in contact with a precipitate-forming solution and then calcining the resulting precipitates containing the foregoing four elements to give the intended PLZT calcined powder. If the PLZT calcined powder is calcined at ordinary pressure in a desired atmosphere, a PLZT ceramic having a high light transmittance comparable to that of the PLZT ceramics obtained according to the hot-pressing method can be obtained. However, this method comprises complicated processes and the raw material to be used is expensive. Under such circumstances, there has been desired the development of a method for preparing a PLZT ceramic which comprises the steps of preparing PLZT calcined powder from a cheap raw material according to a dry method which is easily practicable, then forming the powder into a molded product having a desired shape and calcining the molded product at ordinary pressure in a desired atmosphere.

The technique disclosed in J.P. KOKAI No. Sho 64-79068 comprises the steps of introducing powder for forming a Pb vapor-containing atmosphere which comprises lead zirconate (PbZrO₃) and lead oxide (PbO) into a reactor of aluminum provided with a cover, placing an MgO plate on the powder for forming a Pb vapor-containing atmosphere, placing a molded product obtained from PLZT powder on the MgO plate to thus subject the molded product to a normal pressure-calcination in an oxygen gas atmosphere. If this method is adopted, there can be obtained a PLZT ceramic having a relatively high light transmittance from PLZT calcined powder prepared by a dry method. However, PLZT powder obtained according to the dry method has a particle size greater than that of the powder obtained according to a wet method and, therefore, the sintering properties thereof are insufficient. For this reason, this method suffers from a problem of low reproducibility and the resulting product does not have sufficient light transmittance.

SUMMARY OF THE INVENTION

Accordingly, an object of the present invention is to provide a method for preparing a PLZT transparent ceramic having a high light transmittance in good reproducibility by preparing PLZT calcined powder capable of being easily sintered according to a dry method, forming the calcined powder into a molded product having a desired shape and then calcining the molded product at ordinary pressure.

Another object of the present invention is to provide a PLZT transparent ceramic having high light transmittance.

The inventors of this invention have conducted intensive studies to achieve the foregoing object, have found out that such PLZT calcined powder capable of being easily sintered can effectively be formed by addition of Sm₂O₃ or Bi₂O₃ as an auxiliary agent for sintering and thus have completed the present invention.

According to an aspect of the present invention, the foregoing object can effectively be achieved by providing a method for preparing a PLZT ceramic having a composition represented by the following general formula:

$$(Pb_{1-x}La_x)(Zr_{1-y}Ti_y)_{1-0.25x}O_3$$

(wherein x is a numerical value ranging from 0.01 to 0.3 and y is a numerical value ranging from 0.05 to 0.95). The method is characterized by comprising the steps of preparing PLZT calcined powder from oxides of Pb, La, Zr and Ti or compounds which can be converted into these oxides, respectively, through calcination as starting materials; mixing Sm₂O₃ or Bi₂O₃ as an auxiliary agent for sintering with the calcined powder; forming the resulting mixture into a molded product having a desired shape; and then subjecting the molded product to normal pressure calcination at a temperature ranging from 1,000° to 1,300° C. in an atmosphere comprising oxygen gas and Pb vapor.

According to another aspect of the present invention, there is provided a PLZT transparent ceramic having high light transmittance which has a composition represented by the foregoing general formula and which comprises a small amount of samarium oxide or bismuth oxide.

BRIEF EXPLANATION OF THE DRAWING

FIG. 1 is a graph showing the relation between the light transmittance and wavelength observed on the sintered bodies obtained according to the present invention and a conventional method.

DESCRIPTION OF THE PREFERRED EMBODIMENTS

The PLZT transparent ceramic and the method for preparing the same according to the present invention will hereinafter be explained in more detail.

In the foregoing general formula, x and y vary depending on the applications of the PLZT ceramic and if the PLZT transparent ceramic is used as optoelectronic materials or piezo-electric materials, x preferably ranges from 0.01 to 0.3, while y preferably ranges from 0.05 to 0.95.

In the method of the present invention, if the compounds which can be converted into the oxides of Pb, La, Zr and Ti through calcination, for instance, carbonates, hydroxides or acetates are employed as starting materials, these compounds are converted into the corresponding oxides during the calcination process.

The method for preparing the PLZT transparent ceramic according to the present invention can be carried out, for instance, according to the following manner. First, desired amounts of lead oxide, lanthanum oxide, zirconium oxide and titanium oxide (or carbonates, hydroxides, acetates or the like of these elements) are mixed with a ball mill together with a solvent such as water or an alcohol. Then the solvent such as water or an alcohol is removed from the mixture, the mixture is pulverized and then calcined at a temperature ranging from 800° to 1,000° C. for about 2 hours. Samarium oxide or bismuth oxide is added to the calcined powder in an amount of 0.001 to 5 mole % on the basis of the molar amount of the calcined powder and the resulting mixture is mixed through ball-milling in the coexistence of a solvent such as water or an alcohol. Thereafter, the solvent is removed and the mixture is pulverized to give PLZT calcined powder capable of being easily sintered. The calcined powder is uniformly mixed with an organic binder such as polyvinyl alcohol, dried, pulverized and then subjected to pressure molding (at a pressure ranging from 100 to 3,000 kg/cm²). The resulting molded product is subjected to normal pressure-calcination at a temperature ranging from 1,000° to 1,300° C., preferably 1150° to 1250° C. for 5 to 50 hours in an atmosphere which comprises oxygen gas and Pb vapor to thus give a PLZT transparent ceramic having high light transmittance. In this case, the concentration of the Pb vapor in the atmosphere is not restricted to a specific level so long as it is sufficient for effectively suppressing the scattering of Pb from the molded product.

The method of the present invention can be easily practicable and makes it possible to prepare PLZT calcined powder capable of being easily sintered from a cheap raw material according to a dry method. The PLZT calcined powder capable of being easily sintered can provide a PLZT transparent ceramic having high light transmittance in good reproducibility by forming it into a molded product having a desired shape and then subjecting the molded product to normal pressure calcination.

The present invention will hereunder be explained in more detail with reference to the following non-limitative working Examples and the effects practically attained by the present invention will also be discussed in comparison with Comparative Example given below.

EXAMPLE 1

Powdery lead oxide (PbO), lanthanum oxide (La$_2$O$_3$), zirconium oxide (ZrO$_2$) and titanium oxide (TiO$_2$) were blended in a ratio such that they provide a composition represented by the formula:

$(Pb_{0.91}La_{0.09})(Zr_{0.65}Ti_{0.35})_{0.9775}O_3$ and then ball-milled together with ethanol to uniformly mix them. Then the ethanol was removed, the mixture was pulverized and calcined at 900° C. for 2 hours in the air. Samarium oxide (Sm$_2$O$_3$) was added to the mixture (calcined powder) in an amount of 0.5 mole % on the basis of the molar amount of the calcined powder and the resulting mixture was mixed together with ethanol through ball-milling. Then the ethanol was removed and the mixture was pulverized to thus give PLZT calcined powder capable of being easily sintered. Polyvinyl alcohol was added to the calcined powder in an amount of 0.8% by weight and the mixture was formed into a product having a diameter of 20 mm φ and a thickness of 2 mm under a pressure of 1 ton/cm² and then calcined at 1,200° C. and ordinary pressure for 25 hours in a mixed atmosphere comprising oxygen gas and lead vapor. The relation between light transmittance and wavelength observed on the resulting sintered body having a thickness of 400 μm shown in FIG. 1 as the curve A. The light transmittance thereof at a wavelength of 630 nm was 65%.

EXAMPLE 2

Powdery lead oxide (PbO), lanthanum oxide (La$_2$O$_3$), zirconium oxide (ZrO$_2$) and titanium oxide (TiO$_2$) were blended in a ratio such that they provide a composition represented by the formula:

$(Pb_{0.91}La_{0.09})(Zr_{0.65}Ti_{0.35})_{0.9775}O_3$ and then ball-milled together with ethanol to uniformly mix them. Then the ethanol was removed, the mixture was pulverized and calcined at 900° C. for 2 hours in the air. Bismuth oxide (Bi$_2$O$_3$) was added to the mixture (calcined powder) in an amount of 0.5 mole % on the basis of the molar amount of the calcined powder and the resulting mixture was mixed together with ethanol through ball-milling. Then the ethanol was removed and the mixture was pulverized to thus give PLZT calcined powder capable of being easily sintered. Polyvinyl alcohol was added to the calcined powder in an amount of 0.8% by weight and the mixture was formed into a product having a diameter of 20 mmφ and a thickness of 2 mm under a pressure of 1 ton/cm² and then calcined at 1,200° C. and ordinary pressure for 25 hours in a mixed atmosphere comprising oxygen gas and lead vapor. The light transmittance of the resulting sintered body having a thickness of 400 μm was 64% at a wavelength of 630 nm.

COMPARATIVE EXAMPLE 1

The same procedures used in Example 1 were repeated except that samarium oxide was not used at all. More specifically, powdery PbO, La$_2$O$_3$, ZrO$_2$ and TiO$_2$ were blended in a ratio such that they provide a composition represented by the formula:

$$(Pb_{0.91}La_{0.09})(Zr_{0.65}Ti_{0.35})_{0.9775}O_3$$

and then ball-milled together with ethanol to uniformly mix them. Then the ethanol was removed, the mixture was pulverized and calcined at 900° C. for 2 hours in the air. Then the mixture was pulverized to thus give PLZT calcined powder. Polyvinyl alcohol was added to the calcined powder in an amount of 0.8% by weight and the mixture was formed into a product having a diameter of 20 mm$\phi$ and a thickness of 2 mm under a pressure of 1 ton/cm$^2$ and then calcined at 1,200° C. and ordinary pressure for 25 hours in a mixed atmosphere comprising oxygen gas and lead vapor. The relation between the light transmittance and the wavelength of the resulting sintered body having a thickness of 400 μm is shown in FIG. 1 as the curve B. The light transmittance thereof at a wavelength of 630 nm was as low as 58%.

As has been detailed above, the PLZT transparent ceramic obtained according to the method of this invention has a light transmittance substantially higher than that of the PLZT transparent ceramic obtained by a conventional method in which samarium oxide or bismuth oxide is not used at all. Therefore, the PLZT transparent ceramic of the present invention can be anticipated as materials for various optoelectronic devices, piezo-electric devices, electrostrictive elements or the like.

We claim:

1. A method for preparing a transparent PLZT ceramic having a composition represented by the following general formula:

$$(Pb_{1-x}La_x)(Zr_{1-y}Ti_y)_{1-0.25x}O_3$$

(wherein x is a numerical value ranging from 0.01 to 0.3 and y is a numerical value ranging from 0.05 to 0.95), the method being characterized by comprising the steps of preparing PLZT calcined powder from oxides of Pb, La, Zr and Ti or compounds which can be converted into these oxides, respectively, through calcination as starting materials; mixing at least one oxide selected from the group consisting of Sm$_2$O$_3$ and Bi$_2$O$_3$ as an auxiliary agent for sintering with the calcined powder; forming the resulting mixture into a molded product having a desired shape; and then subjecting the molded product to normal pressure calcination at a temperature ranging from 1,000° to 1,300° C. in an atmosphere consisting essentially of oxygen gas and Pb vapor.

2. The method for preparing a PLZT ceramic as set forth in claim 1 wherein the compounds which can be converted into oxides of Pb, La, Zr and Ti through calcination are in the form of carbonates, hydroxides or acetates and these compounds are converted into the corresponding oxides during the calcination process.

3. The method for preparing a PLZT ceramic as set forth in claim 1 wherein the amount of the auxiliary agent for sintering ranges from 0.001 to 5 mole % on the basis of the molar amount of the calcined powder.

4. The method for preparing a PLZT ceramic as set forth in claim 1 wherein the method comprises the steps of mixing desired amounts of lead oxide, lanthanum oxide, zirconium oxide and titanium oxide or carbonates, hydroxides or acetates of these elements by a ball mill in the presence of a solvent; then removing the solvent from the mixture; pulverizing the mixture; then calcining the mixture at a temperature ranging from 800° to 1,000° C., for about 2 hours; adding samarium oxide or bismuth oxide as an auxiliary agent for sintering to the calcined powder in an amount of 0.001 to 5 mole % on the basis of the molar amount of the calcined powder; mixing the resulting mixture through ball-milling in the coexistence of a solvent; thereafter, removing the solvent, pulverizing the mixture to give PLZT calcined powder capable of being easily sintered; uniformly mixing the calcined powder with an organic binder; drying, pulverizing and then subjecting to pressure molding at a pressure ranging from 100 to 3,000 kg/cm$^2$; subjecting the resulting molded product to normal pressure-calcination at a temperature ranging from 1,000° to 1,300° C., for 5 to 50 hours, in an atmosphere which consists essentially of oxygen gas and Pb vapor to thus give a PLZT transparent ceramic having high light transmittance.

5. The method for preparing a PLZT ceramic as set forth in claim 1, wherein the auxiliary agent for sintering is Sm$_2$O$_3$.

6. The method for preparing a PLZT ceramic as set forth in claim 1, wherein the auxiliary agent for sintering is Bi$_2$O$_3$.

* * * * *